United States Patent [19]

Tange

[11] Patent Number: 5,030,974

[45] Date of Patent: Jul. 9, 1991

[54] IMAGE RECORDING APPARATUS WITH RECORDING ELECTRODE ARRAY

[75] Inventor: Keigo Tange, Azuchi, Japan

[73] Assignee: Minolta Camera Kabushiki Kaisha, Osaka, Japan

[21] Appl. No.: 465,896

[22] Filed: Jan. 16, 1990

[30] Foreign Application Priority Data

| | | | |
|---|---|---|---|
| Jan. 17, 1989 | [JP] | Japan | 1-1881 |
| Jan. 17, 1989 | [JP] | Japan | 1-1882 |
| Jan. 17, 1989 | [JP] | Japan | 1-1883 |

[51] Int. Cl.[5] ...................... G01D 15/06; G03G 15/02

[52] U.S. Cl. ...................................... 346/155; 355/219

[58] Field of Search .......................... 346/155; 355/219

[56] References Cited

U.S. PATENT DOCUMENTS

| | | | |
|---|---|---|---|
| 4,704,621 | 11/1987 | Van Cooten et al. | 346/155 X |
| 4,734,720 | 3/1988 | Ishii et al. | 346/155 |
| 4,831,394 | 5/1989 | Ochiai et al. | 346/155 X |
| 4,875,060 | 10/1989 | Masuda et al. | 346/155 |
| 4,931,876 | 6/1990 | Hashizume | 346/155 X |

FOREIGN PATENT DOCUMENTS

| | | |
|---|---|---|
| 57-114156 | 7/1982 | Japan . |
| 57-190964 | 11/1982 | Japan . |
| 58-33269 | 2/1983 | Japan . |
| 60-17458 | 1/1985 | Japan . |
| 60-263962 | 12/1985 | Japan . |

*Primary Examiner*—George H. Miller, Jr.
*Attorney, Agent, or Firm*—Burns, Doane, Swecker & Mathis

[57] ABSTRACT

An image recording apparatus including a plurality of electrode elements arranged in a line and a supporting member for supporting the plurality of electrode elements, the improvement comprising means for magnetically transporting a developer to the plurality of electrode elements, wherein a pointed end of each electrode element sinking in the supporting member so that a wall portion is defined between the neighboring electrode elements.

22 Claims, 12 Drawing Sheets

IMAGE RECORDING APPARATUS WITH RECORDING ELECTRODE ARRAY

BACKGROUND OF THE INVENTION (1) Field of the Invention

This invention relates to an image recording apparatus for recording an image by selectively adhering a developer on a recording material using a recording electrode array including a plurality of recording electrodes arranged in a line.

(2) Description of the Related Art

As an image recording apparatus using a recording electrode array as mentioned above, the ones disclosed in Japanese Patent Publication Kokai Nos. 57-114156, 57-190964 and 58-33269 are well known. These apparatus are each equipped with a counter electrode opposed to a recording electrode array with a recording material therebetween. Voltages corresponding to image signals are selectively applied to the plurality of recording electrodes, whereby to adhere a magnetic toner onto the recording material. Since such an apparatus requires no photoconductive drum or exposure device, the construction can be simpler and more compact compared with different-type apparatus such as a laser printer. However, this type of image recording apparatus requires high voltages to be applied to the recording electrodes, meaning a high possibility of an electric leakage between the neighboring recording electrodes. Lowering the voltages applied to the electrodes for preventing leakage deteriorates image clearness.

One of the above prior art materials, Japanese Patent Publication Kokai No. 58-33269, discloses a counter electrode array including a plurality of electrode elements, which are respectively opposed to the recording electrodes of the recording electrode array. This construction causes a leakage between the electrode elements of the counter electrode array.

Each image recording apparatus disclosed in the above three publications has the recording electrode array on a fixed sleeve, and the sleeve has a magnet roller therein for transporting a magnetic toner. Such a construction generates toner cloud (floating toner diffused in a smoke which is not involved in recording). Due to the toner cloud, unnecessary floating toner is adhered on the recording material, which causes fogging (black points and other noises printed around letters and pictures) and so lowers the image quality.

SUMMARY OF THE INVENTION

Accordingly, it is a primary object of this invention to offer an image recording apparatus for preventing an electric leakage from occurring between neighboring recording electrodes of a recording electrode array.

It is another object of this invention to offer an image recording apparatus which is equipped with a counter electrode including a plurality of electrode elements which are respectively opposed to the recording electrodes of the recording electrode array and also prevents an electric leakage from occurring between neighboring electrode elements.

It is still another object of this invention to offer an image recording apparatus for alleviating adverse effects of toner cloud generated in the vicinity of the recording electrode array.

Realization of either one of the above three objects leads to generation of an optimum electric field for image forming whereby to obtain a high quality image on a recording material.

The above objects are fulfilled by image recording apparatus for forming an image on a recording material, the apparatus comprising a recording head including a plurality of recording electrodes arranged in a line and a supporting member for supporting the plurality of recording electrodes, a pointed end of each recording electrode sinking in the supporting member; a sleeve on which the recording head is disposed; a counter electrode opposed to the recording head; a rotatable magnet roller arranged in the sleeve for transporting a developer to the recording head; and means for selectively applying an electric voltage to each recording electrode to provide the developer onto a recording material between the recording head and the counter electrode.

The above objects are also fulfilled by an image recording apparatus for forming an image on a recording material, the apparatus comprising a recording head including a plurality of recording electrodes arranged in a line and a first supporting member for supporting the plurality of recording electrodes, a pointed end of each recording electrode sinking in the first supporting member; a counter electrode unit including a plurality of counter electrodes opposed to the plurality of recording electrodes, respectively, and a second supporting member for supporting the plurality of counter electrodes, a pointed end of each counter electrode sinking in the second supporting member; transporting means for transporting a developer to the recording head; first applying means for selectively applying a first electric voltage to each recording electrode to provide the developer onto a recording material between the recording head and the counter electrode unit; and second applying means for selectively applying a second electric voltage of the opposite polarity from that of the first electric voltage to each counter electrode.

The above objects are also fulfilled by an image recording apparatus including a plurality of electrode elements arranged in a line and a supporting member for supporting the plurality of electrode elements, the improvement comprising means for magnetically transporting a developer to the plurality of electrode elements, wherein a pointed end of each electrode element sinking in the supporting member so that a wall portion is defined between the neighboring electrode elements.

In the above construction, since the pointed end of each recording electrode is sinking in the supporting member, the practical distance between the neighboring recording electrodes is larger than the case where the end of the recording electrodes are on the same plane with a top surface of the supporting member. Therefore, the recording electrodes are better insulated from one another, which makes an electric leakage hard to occur between the neighboring recording electrodes even if high voltages are applied to the recording electrodes. As a result, an optimum electric field for high quality image forming can be easily generated.

In compliance with the high voltage application to the recording electrodes, the bias voltages applied to the counter electrode or the counter electrode unit can also be high. Accordingly, a portion of the recording material on which the toner is to be adhered and the remaining portion thereof can be largely different in electric potential, which also contributes to generation of a desirable electric field. As a result, unnecessary toner is restricted from adhering on the above remaining portion, whereby a clear, high quality image can be obtained.

The above objects are also fulfilled by an image recording apparatus for forming an image on a recording material, the apparatus comprising a recording head including a plurality of recording electrodes arranged in a line and a first supporting member for supporting the plurality of recording electrodes; a counter electrode unit including a plurality of counter electrodes opposed to the plurality of recording electrodes, respectively, and a second supporting member for supporting the plurality of counter electrodes, a pointed end of each counter electrode sinking in the second supporting member; transporting means for transporting a developer to the recording head; applying means for selectively applying an electric voltage to each recording electrode to provide the developer onto a recording material between the recording head and the counter electrode unit.

The above objects are also fulfilled by an image recording apparatus for forming an image on a recording material, the apparatus comprising a recording head including a plurality of recording electrodes arranged in a line and a first supporting member for supporting the plurality of recording electrodes; a counter electrode unit including a plurality of counter electrodes opposed to the plurality of recording electrodes, respectively, and a second supporting member for supporting the plurality of counter electrodes, a pointed end of each counter electrode sinking in the second supporting member; transporting means for transporting a developer to the recording head; first applying means for selectively applying a first electric voltage to each recording electrode to provide the developer onto a recording material between the recording head and the counter electrode unit; and second applying means for selectively applying a second electric voltage of the opposite polarity from that of the first electric voltage to each counter electrode.

In the above construction, since the pointed end of each counter electrode is sinking in the counter electrode unit, the practical distance between the neighboring counter electrodes is large, whereby the counter electrodes are well insulated from one another. This means an electric leakage hard to occur between the neighboring counter electrodes even if high bias voltages are applied to the counter electrode unit, which leads to excellence in image quality.

The above objects are also fulfilled by an image recording apparatus for forming an image on a recording material, the apparatus comprising a recording head including a plurality of recording electrodes arranged in a line and a supporting member for supporting the plurality of recording electrodes; a counter electrode opposed to the recording head; transporting means for transporting a developer to the recording head; an auxiliary electrode disposed in the vicinity of the counter electrode; first applying means for selectively applying a first electric voltage to each recording electrode to provide the developer onto a recording material between the recording head and the counter electrode; second applying means for applying a second electric voltage of the opposite polarity from that of the first electric voltage to the counter electrode; and third applying means for applying a third electric voltage of the opposite polarity from that of the second electric voltage to the auxiliary electrode.

The above objects are also fulfilled by an image recording apparatus for forming an image on a recording material, the apparatus comprising a recording head including a plurality of recording electrodes arranged in a line and a supporting member for supporting the plurality of recording electrodes, a pointed end of each recording electrode sinking in the supporting member; a counter electrode opposed to the recording head; transporting means for transporting a developer to the recording head; an auxiliary electrode disposed in the vicinity of the counter electrode; first applying means for selectively applying a first electric voltage to each recording electrode to provide the developer onto a recording material between the recording head and the counter electrode; second applying means for applying a second electric voltage of the opposite polarity from that of the first electric voltage to the counter electrode; and third applying means for applying a third electric voltage of the opposite polarity from that of the second electric voltage to the auxiliary electrode.

The above objects are also fulfilled by an image recording apparatus for forming an image on a recording material, the apparatus comprising a recording head including a plurality of recording electrodes arranged in a line and a first supporting member for supporting the plurality of recording electrodes; a counter electrode unit including a plurality of counter electrodes opposed to the plurality of recording electrodes, respectively, and a second supporting member for supporting the plurality of counter electrodes, a pointed end of each counter electrode sinking in the second supporting member; transporting means for transporting a developer to the recording head; an auxiliary electrode disposed in the vicinity of the counter electrode unit; first applying means for selectively applying a first electric voltage to each recording electrode to provide the developer onto a recording material between the recording head and the counter electrode unit; second applying means for selectively applying a second electric voltage of the opposite polarity from that of the first electric voltage to each counter electrode; and third applying means for applying a third electric voltage of the opposite polarity from that of the second electric voltage to the auxiliary electrode.

The above objects are also fulfilled by an image recording apparatus for forming an image on a recording material, the apparatus comprising a recording head including a plurality of recording electrodes arranged in a line and a first supporting member for supporting the plurality of recording electrodes, a pointed end of each recording electrode sinking in the first supporting member; a counter electrode unit including a plurality of counter electrodes opposed to the plurality of recording electrodes, respectively, and a second supporting member for supporting the plurality of counter electrodes, a pointed end of each counter electrode sinking in the second supporting member; transporting means for transporting a developer to the recording head; an auxiliary electrode disposed in the vicinity of the counter electrode unit; first applying means for selectively applying a first electric voltage to each recording electrode to provide the developer onto a recording material between the recording head and the counter electrode unit; second applying means for selectively applying a second electric voltage of the opposite polarity from that of the first electric voltage to each counter electrode; and third applying means for applying a third electric voltage of the opposite polarity from that of the second electric voltage to the auxiliary electrode.

In the above construction, the auxiliary electrode is given the same polarity with that of the recording electrodes. Since some components of electric lines of force which would, without the auxiliary electrode, divert from the desirable toner transporting path between the recording head and the counter electrode or the counter electrode unit converge in the vicinity of the auxiliary electrode, whereby an optimum electric field is generated. Accordingly, the toner transported by Coulomb's force also converges in the vicinity of the auxiliary electrode to improve resolution and to substantially eliminate toner cloud. The result is a clear, high quality image.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

Embodiment I

A first embodiment according to this invention will be explained referring to FIGS. 1 through 10.

Figure 1:
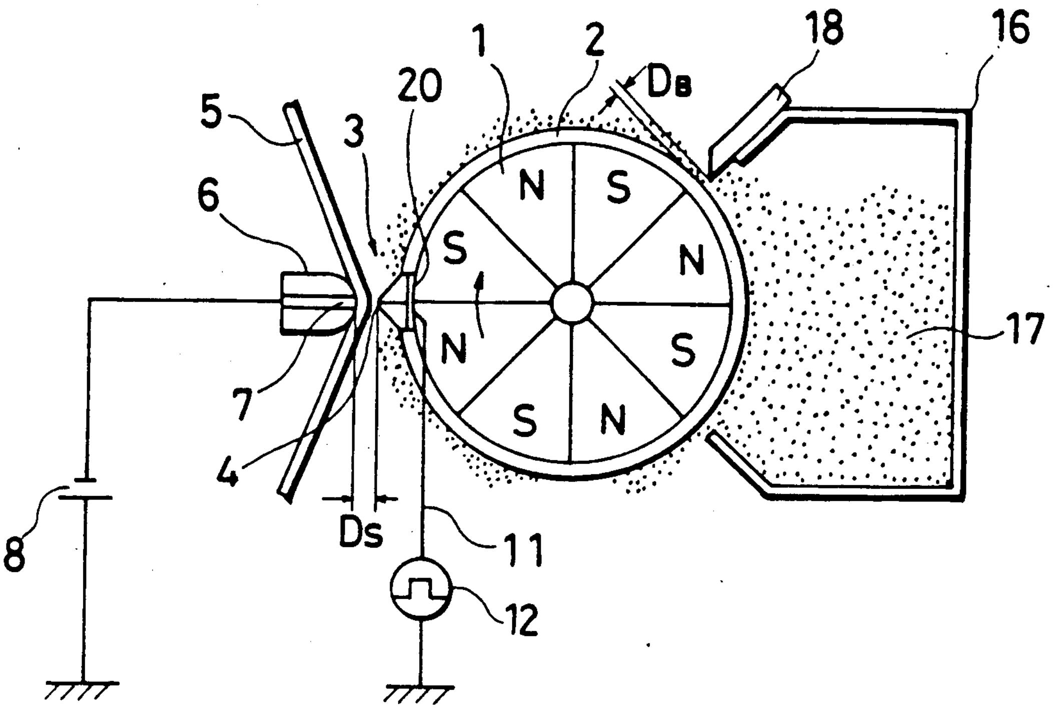
FIG. 1 schematically shows a vertical cross section of an image recording apparatus according to a first embodiment of this invention.

In FIG. 1, an image recording apparatus has a sleeve 2 fixed at a specified position thereof, the sleeve 2 including therein a rotatable magnet roller 1. The sleeve 2 has an opening 20 on a left (FIG. 1) portion of a peripheral surface thereof, the opening 20 running in parallel with a rotating axis of the magnet roller 1. A recording head 3 including a recording electrode array 4 is supported in the opening 20 also in parallel with the above axis with a tip portion thereof projected outward. Opposed to the recording head 3 is a holder 6, which includes a counter electrode 7. An upper surface of the holder 6 is curved upward with a specified radius of curvature. A recording material 5 such as a paper is to be transported between the recording head 3 and the counter electrode 7.

Disposed to the opposite side of the sleeve 2 from the counter electrode 7 is a casing 16 for accommodating a toner 17. A doctor blade 18 is provided on an upper left outside wall (FIG. 1) of the casing 16 for adjusting the height of toner brush and the amount of the toner 17 to be carried on the sleeve 2.

The image recording apparatus comprising the above construction is operated in the following manner.

When the magnet roller 1 is rotated clockwise as in FIG. 1, the toner 17 which is charged positive or negative is taken out from the casing 16 in accompaniment with the rotation of the magnet roller 1. The toner 17 is then carried on the peripheral surface of the sleeve 2 while covering the surface in the form of a thin layer, until it reaches the recording head 3.

When voltages and bias voltages corresponding to recording signals are respectively applied to the recording electrode array 4 and the counter electrode 7 in order to make a specified difference in electric potential between 4 and 7, the charged toner 17 is repulsively splattered due to Coulomb's force toward the recording material 5 between the recording electrode array 4 and the counter electrode 7. An image is recorded on the recording material 5 in this way. Thereafter, the recording material 5 is transported to a fixing unit (not shown) to have the image thereon fixed.

The above voltage application is done by a recording power supply 12, and the bias voltage application by a bias power supply 8. It is for approaching the recording electrode array 4 to the counter electrode 7 and thus improving recording efficiency that the tip portion of the recording head 3 is projected outward.

The toner 17 is charged by friction at a position of the doctor blade 18.

For development, a single-component developer comprising an insulating magnetic toner is used in the above embodiment. However, another single-component developer comprising a conductive magnetic toner or a double-component developer comprising an insulating non-magnetic toner and a magnetic carrier can also be used.

In the case of a single-component developer comprising an insulating magnetic toner, the toner is charged by friction with a portion of a developing unit such as the sleeve 2. When an electrostatic force of an electric field between the recording electrode array 4 and the counter electrode 7 gets stronger than a magnetic force of the magnetic roller 1, the charged toner is splattered from the sleeve 2 to be adhered on the recording material 5.

If a single-component developer comprising a conductive magnetic toner is used, the toner is not charged because the toner is also conductive. Instead, a toner chain is formed on the sleeve 2 by a magnetic force. When the toner chain is given an electric potential by the recording electrode array 4, an electric field is formed between the recording electrode array 4 and the counter electrode 7. When an electrostatic force of the electric field gets stronger than a magnetic force of the magnetic roller 1, the toner chain is broken and the toner is splattered from the sleeve 2 to be adhered on the recording material 5. Since the electric potential is given to a tip of the toner chain, the recording efficiency is high and so the voltages applied to the recording electrode array 4 can be as low as several to a hundred volts.

If a double-component developer comprising an insulating non-magnetic toner and a conductive magnetic carrier is used, the toner is charged by friction with the carrier and is carried on the surface of the sleeve 2 while being adhered on peripheral surfaces of carrier grains. When voltages of the same polarity with those of the toner are applied to the recording electrode array 4, the toner is repulsively splattered from the sleeve 2 to be adhered on the recording material 5. Since the carrier is conductive and so accepts an electric potential, the recording efficiency is high.

If a double-component developer comprising an insulating non-magnetic toner and an insulating magnetic carrier is used, the toner is charged by friction with the carrier and is carried on the surface of the sleeve 2 while being electrostatically adhered on peripheral surfaces of carrier grains. When voltages of the same polarity with those of the toner applied to the recording electrode array 4, the toner is repulsively splattered from the sleeve 2 to be adhered on the recording material 5. Since the carrier is insulating, substantially no leakage occurs between the recording electrode array 4 and the counter electrode 7.

A construction of the recording head 3 will be described in more detail referring to FIGS. 2 through 5.

Figure 2:
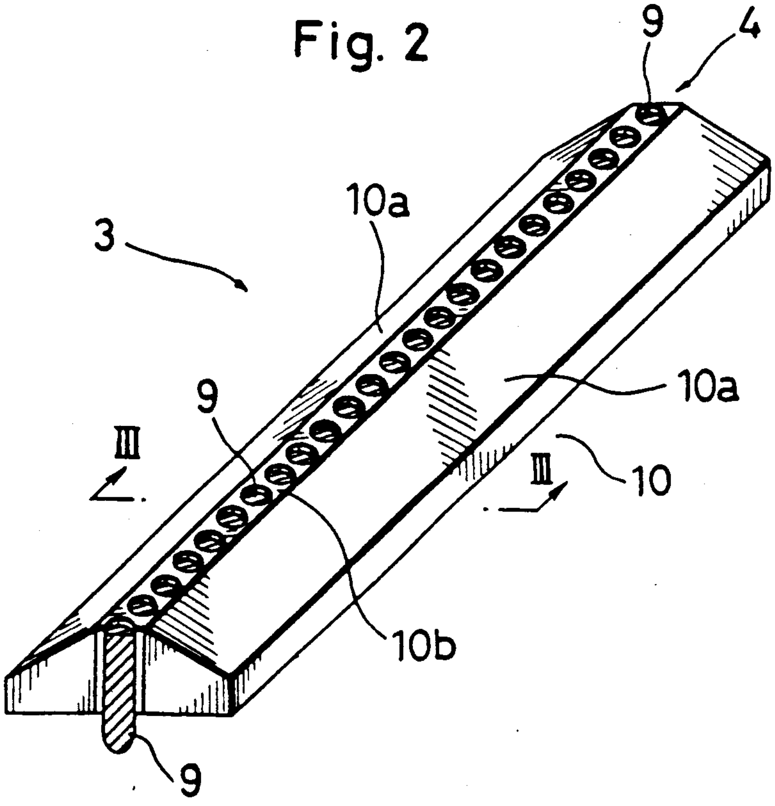
FIG. 2 is a perspective view of a recording electrode array according to the first embodiment.
Figure 3:
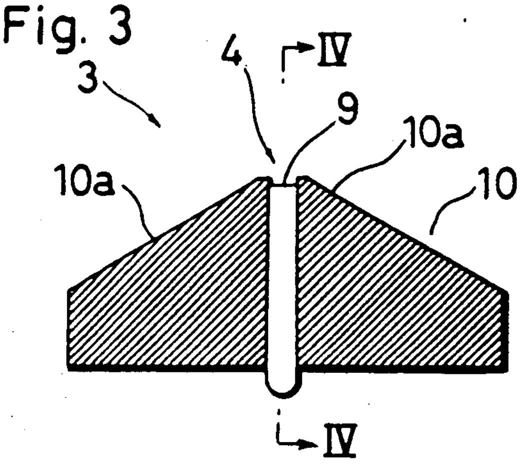
FIG. 3 is a cross sectional view of the same along lines III—III of FIG. 2.
Figure 4:
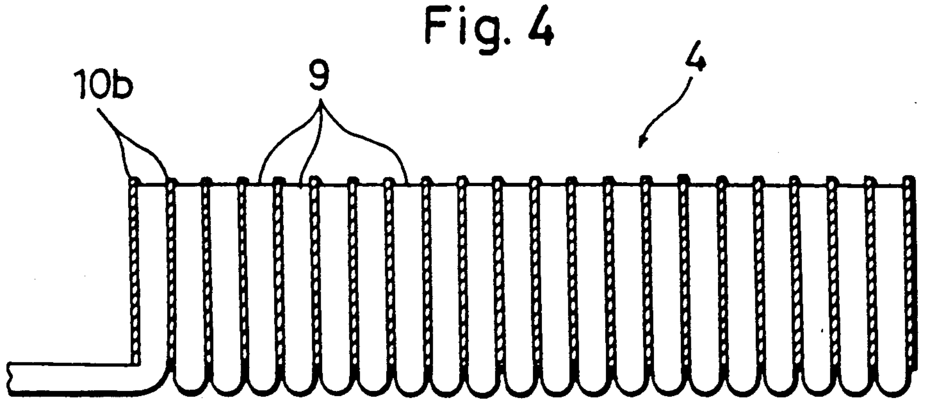
Fig 4 is a longitudinal cross sectional view of the same along lines IV—IV of FIG. 3.

As shown in FIG. 2, the recording head 3, which has the shape of a trapezoidal pillar lying horizontally, comprises a supporting unit 10 formed of a pair of plates 10*a* opposed to each other with a specified size of space therebetween and a plurality of pin recording electrodes 9 as the recording electrode array 4. The pin recording electrodes 9 are linearly arranged in the space, and the remaining space is filled with a filler 10*b*. It should be noted that upper ends of the pin recording electrodes 9 are sunk in the supporting unit 10 so that a wall portion is projected between the neighboring pin recording electrodes 9. Each pin recording electrode 9 is formed of enamel wires, the supporting unit 10 of acrylic resin, and the filler 10*b* of epoxy resin.

Figure 5:
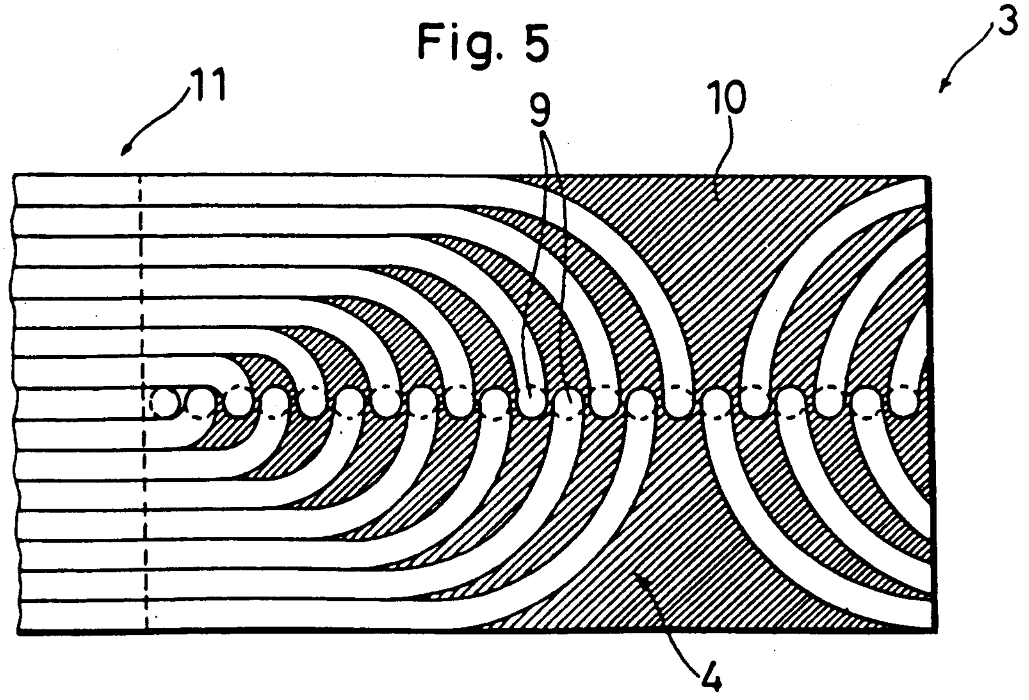
FIG. 5 is a bottom view of the same.
Figure 6:
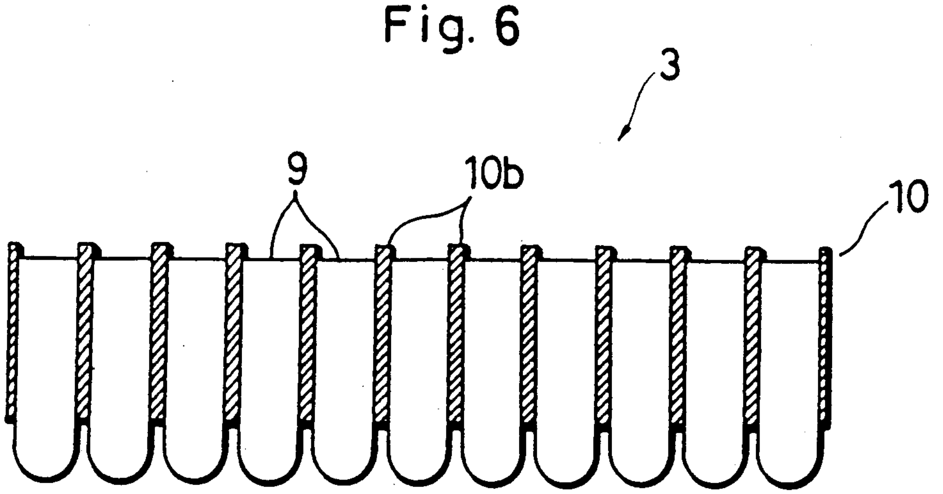
FIG. 6 is an enlarged view of the longitudinal cross section of the same.
Figure 7:
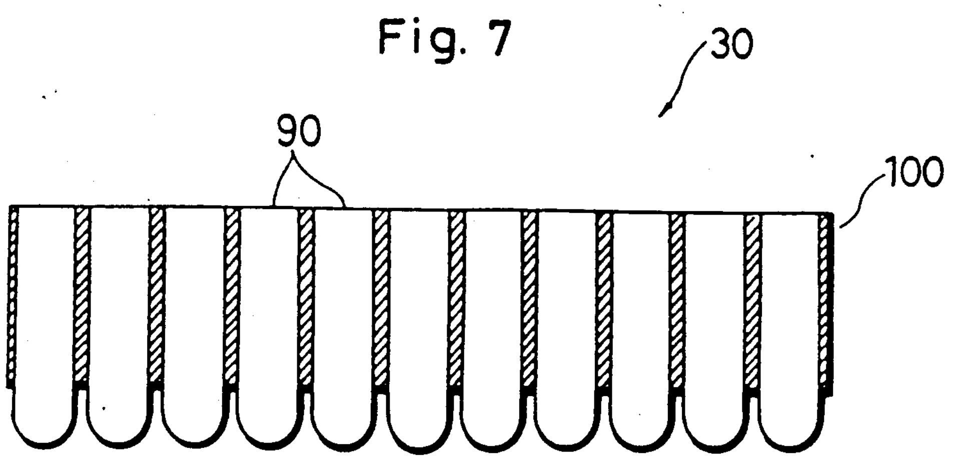
FIG. 7 is an enlarged view of a longitudinal cross section of another recording electrode array as a comparative example, FIG. 8 explains symbols of Table 1, FIG. 9 schematically shows toner grains adhered on the pin recording electrodes of the first embodiment, FIG. 10 schematically shows toner grains adhered on the pin recording electrodes of the comparative example, FIG. 11 schematically shows a vertical cross section of an image recording apparatus according to a second embodiment of this invention.
Figure 8:
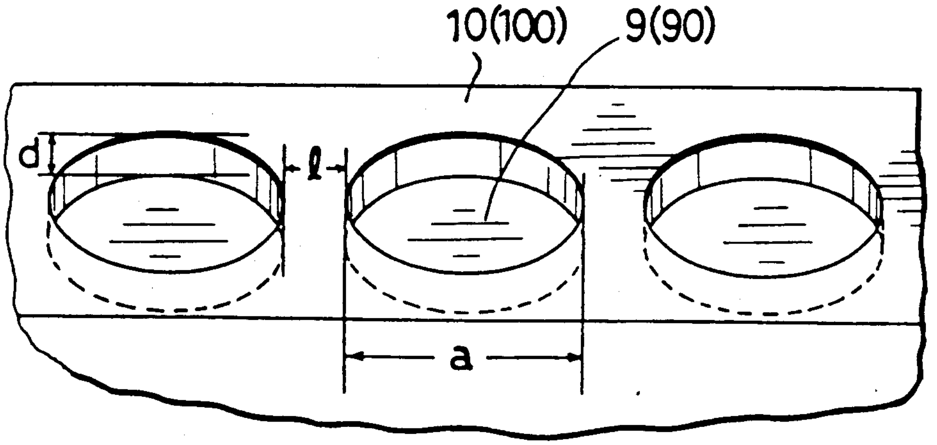

As shown in FIG. 5, bottom ends of the pin recording electrodes 9 are extended with no contact with one another for a certain length and gathered on a bottom surface of the recording head 3 to form an electrode cord 11. The electrode cord 11 is connected to the recording power supply 12. The recording power supply 12 is to selectively apply the voltages to the pin recording electrodes 9.

The recording head 3 is produced by the following method. After loading the pin recording electrodes 9 in the above space, the filler 10*b* is injected into the space and solidified. Thus, the pin recording electrodes 9 are integrated with the supporting member 10. The upper ends of the pin recording electrodes 9 are sunk in the supporting unit 10 by immersing an upper portion of the unit 10 in an aqueous solution of iron chloride (with hydrochloric acid) and etching a specified length of the pin recording electrodes 9. The length to be etched is controlled by adjusting the density and temperature of the above solution, immersing time, and the like.

The producing method of the recording head 3, the materials of the pin recording electrodes 9, the supporting unit 10 and the filler 10*b* are not limited to those mentioned above. Any construction in which pin recording electrodes are insulated from one another and supported by a supporting unit also insulated from the electrodes is acceptable. Pin recording electrodes formed of such a permeable material as insulated nickel or ferrite improve. magnetic induction, whereby the height of toner brush can be set high. As a result, fast and accurate recording is realized.

In order to prove sinking the upper ends of the pin recording electrodes 9 in the supporting unit 10 is effective, the following two experiments were conducted. The experiments will be described referring to FIGS. 6 through 10.

A recording head 30 as a comparative example comprises a supporting unit 100 and pin recording electrodes 90.

The specifications of each pin recording electrode 9 and each pin recording electrode 90 will be mentioned in Table 1.

TABLE 1

| | Pin electrode 9 | Pin electrode 90 |
|---|---|---|
| Diameter a (μm) | 200 | 200 |
| Distance between neighboring electrodes l (μm) | 20 | 20 |
| Sinking depth d (μm) | 20 | 0 |

[Experiment I]

Regarding each of the recording head 3 and 30, every other pin recording electrodes were connected to a power supply and the remaining pin recording electrodes were grounded. How leakages occurred was checked by gradually raising the voltages applied to the pin recording electrodes.

Results

While a leakage occurred when voltages were set −300 to −400 V in the head 30, no leakage occurred at −500 V in the head 3.

Reasoning

From the above results, a leakage is attributed to creeping discharge, which occurs with no existence of the toner 17. In the case of the head 3 where the pin recording electrodes 9 are sunk, the practical distance between the neighboring pin recording electrodes is $l+2d=60\ \mu m$. This is larger than $l=20\ \mu m$ in the case of the the head 30. Therefore, the head 3 is more excellent in insulation, and so creeping discharge is hard to occur.

[Experiment II]

The heads 3 and 30 were used for actual recording using the toner 17. For easier explanation, the diameter of the toner grains are illustrated larger than the distance between the neighboring pin recording electrodes in FIGS. 9 and 10.

Results

Also in this experiment, the leakage was smaller in the head 3 than in the head 30.

Reasoning

Experiment II shows the restriction of the leakage in the head 3 is attributed to the following.

When the toner 17 has a large electric resistance, the electric leakage through the toner 17 is small even when there is a large difference in electric potential between one of the pin recording electrodes 9*a* (90*a*) provided with voltages and the neighboring pin recording electrode 9*b* (90*b*) provided with no voltage. Therefore, there is almost no difference in the amount of electric leakage through the toner 17 between in the head 3 and the head 30. However, when the toner 17 has a small electric resistance, the amount of leakage in the head 3 is much smaller than that in the head 30.

Figure 9:
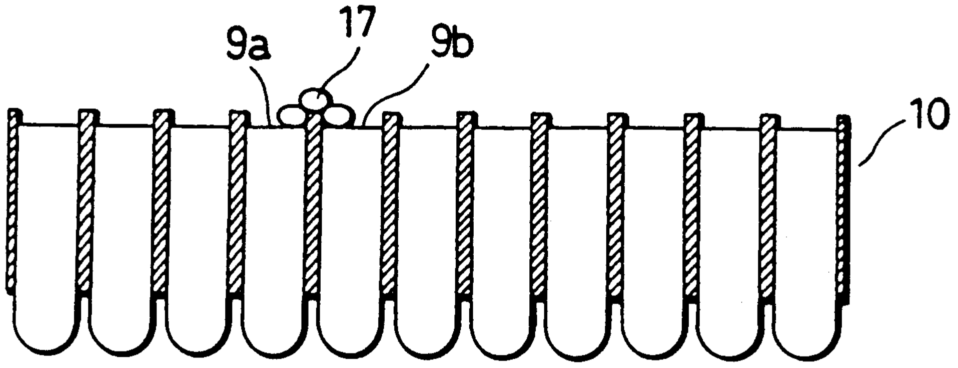
Figure 10:
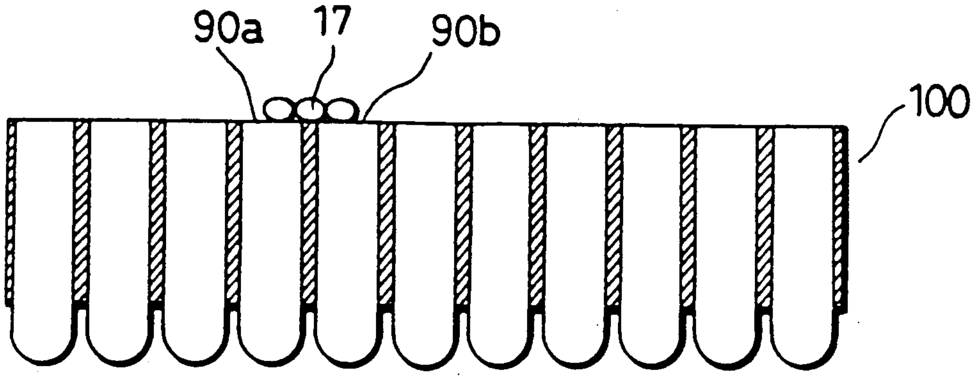

This is due to the following. In the case of the head 30, since the distance between the neighboring pin recording electrodes is short, one toner grain is enough to occur a leakage (FIG. 10). In the case of the head 3, since the practical distance between the neighboring pin recording electrodes is large, at least three toner grains are necessary to occur a leakage (FIG. 9). It means the possibility of a leakage is lower in the head 3 than in the head 30.

According to this invention, even if the toner 17 has a small electric resistance, namely, even if the toner 17 is conductive, a leakage is hard to occur. Since the conductive toner is more effective in improving the recording efficiency, this is a great advantage. A leakage through a conductive carrier can also be restricted for the same reasons.

Embodiment II

A second embodiment will be described referring to FIGS. 11 through 16. The second embodiment has the same construction as the first embodiment except that a counter electrode array 27 includes a plurality of pin counter electrodes 29 (FIG. 12) and that the recording power supply 12 and the bias power supply 8 are constructed differently.

Voltages are applied to the arrays 4 and 27 respectively by the recording power supply 12 and the bias power supply 8. The recording power supply 12 has power supplies 12*a* and 12*b* respectively for applying positive and negative voltages. A switch 12 is provided for selecting positive or negative voltages. The bias power supply 8 has power supplies 8*a* and 8*b* respectively for applying positive and negative voltages. A switch 8*c* is provided for selecting positive or negative voltages. The switches 12*c* and 8*c* are to be switched over by control means (not shown) so that the arrays 4 and 27 are always charged oppositely to generate an electric field.

As the recording or the bias power supplies 12 or 8, a pulse power supply is desirable. If a pulse power supply is employed, the applied voltages can easily be adjusted in compliance with the type of the toner 17 only by changing a duty ratio of an output pulse.

Figure 11:
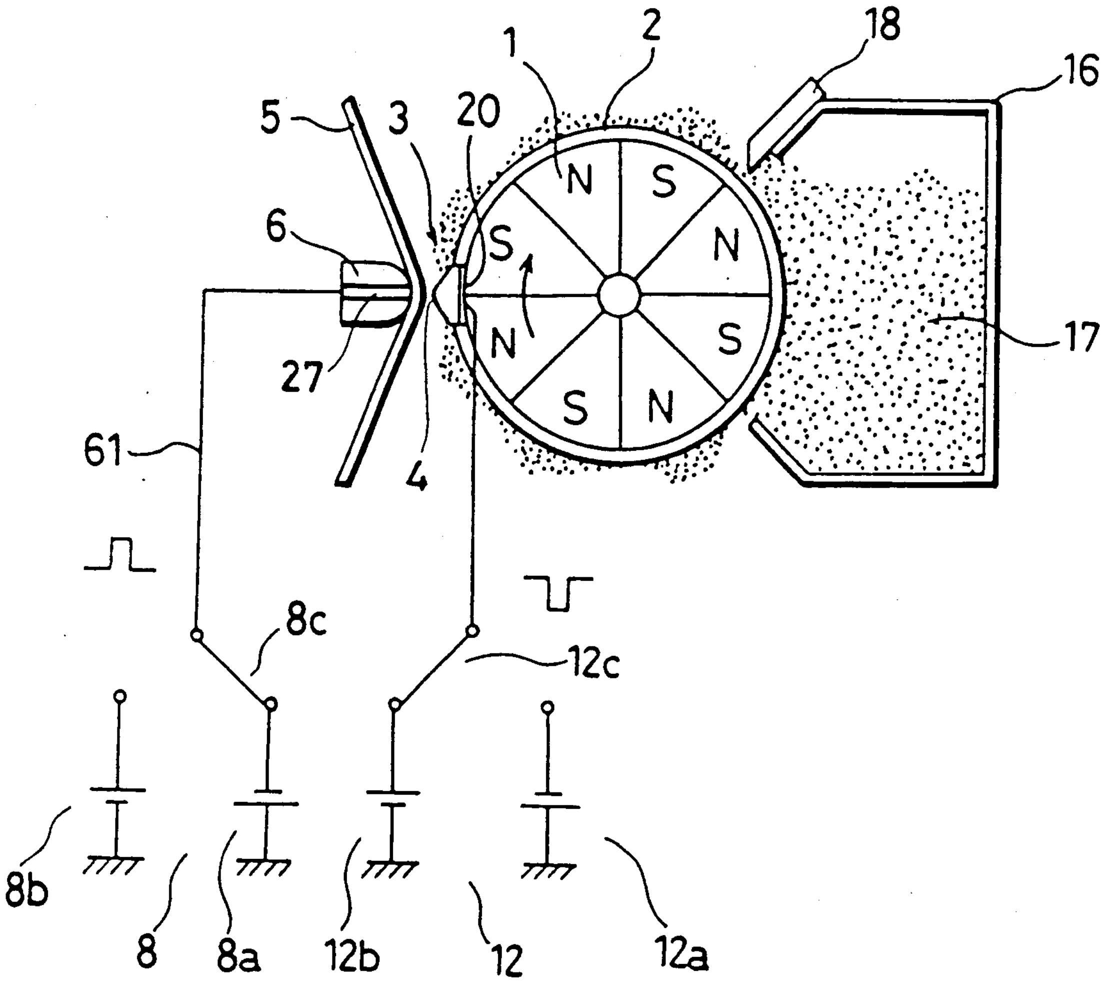

As shown in FIG. 11, the tip portion of the recording head 3 is projected by an appropriate amount toward the counter electrode array 27. As well as strengthening the electric field to improve the image quality, this structure has another advantage mentioned hereinafter. Since the toner which has been transported to this portion is separated from the remaining toner, toner cloud causing fogging is restricted. This second advantage also greatly contributes to excellence in image quality.

The pin recording electrodes 9 of the recording electrode array 4 have their upper ends either sunk in or on the same plane with a top surface of the supporting unit 10.

Figure 12:
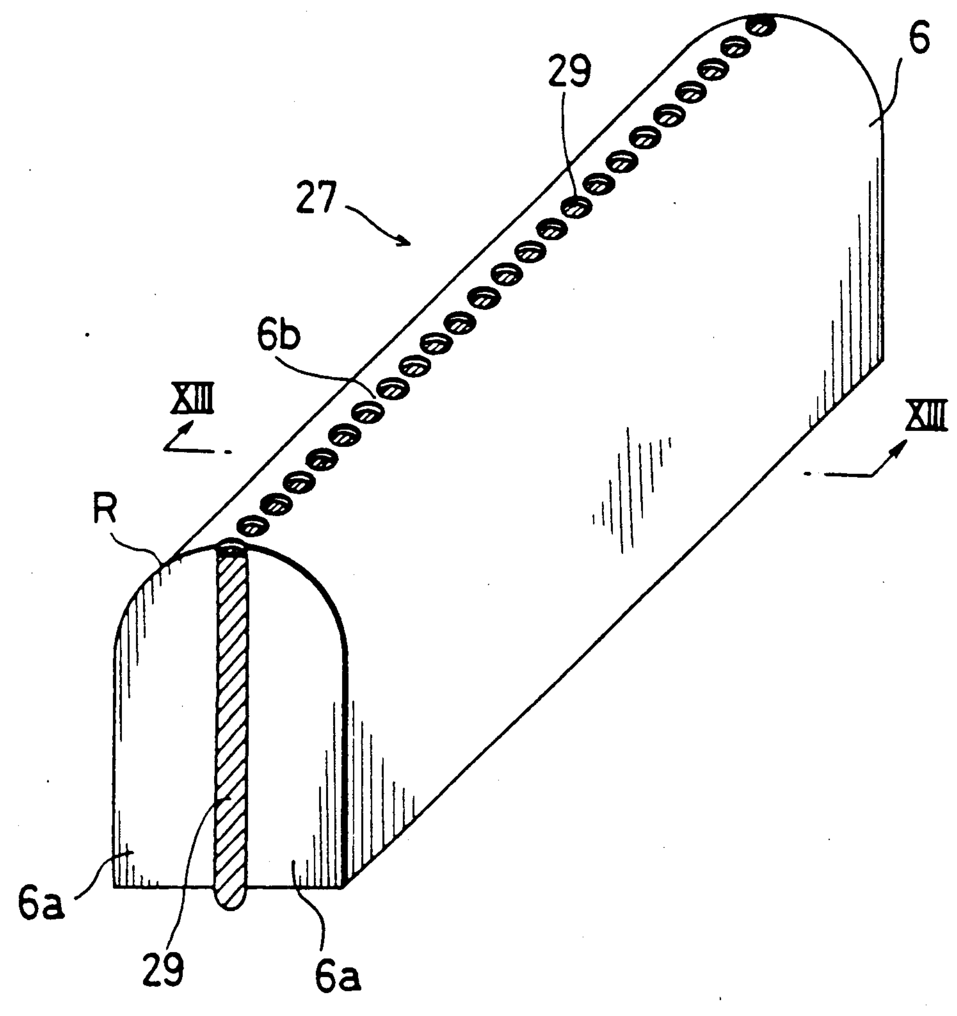
FIG. 12 is a perspective view of a counter electrode array according to the second embodiment.

The counter electrode array 27 and the holder 6 will be described in detail referring to FIG. 12 through 14.

The holder 6 comprises a pair of plates 6*a* opposed to each other with a specified size of space therebetween. The plurality of pin counter electrodes 29 are linearly arranged in the space, and the holder 6 and the counter electrode array 27 are integrated through resin filling the remaining space.

An upper surface of the integrated holder and array is curved upward with a specified radius of curvature (R) for smoothly guiding the recording material 5.

The holder 6 is formed of acrylic, ABS or epoxy resin. The pin counter electrodes 29 are provided in the same number as the pin recording electrodes 9 so that the former and the latter are respectively opposed to each other. Each pin counter electrode 29 is formed of enamel wires.

It should be noted that upper ends of the pin counter electrodes 29 are sunk in the holder 6.

Figure 13:
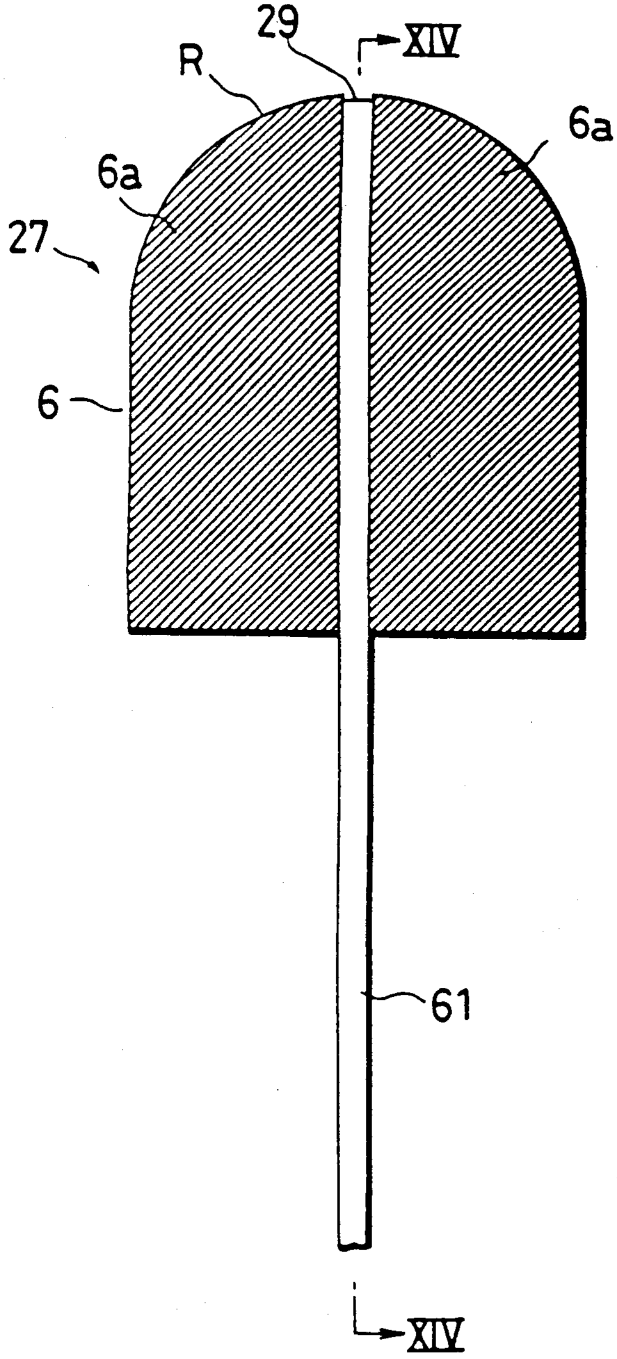
FIG. 13 is a cross sectional view of the same along lines XIII—XIII of FIG. 12.
Figure 14:
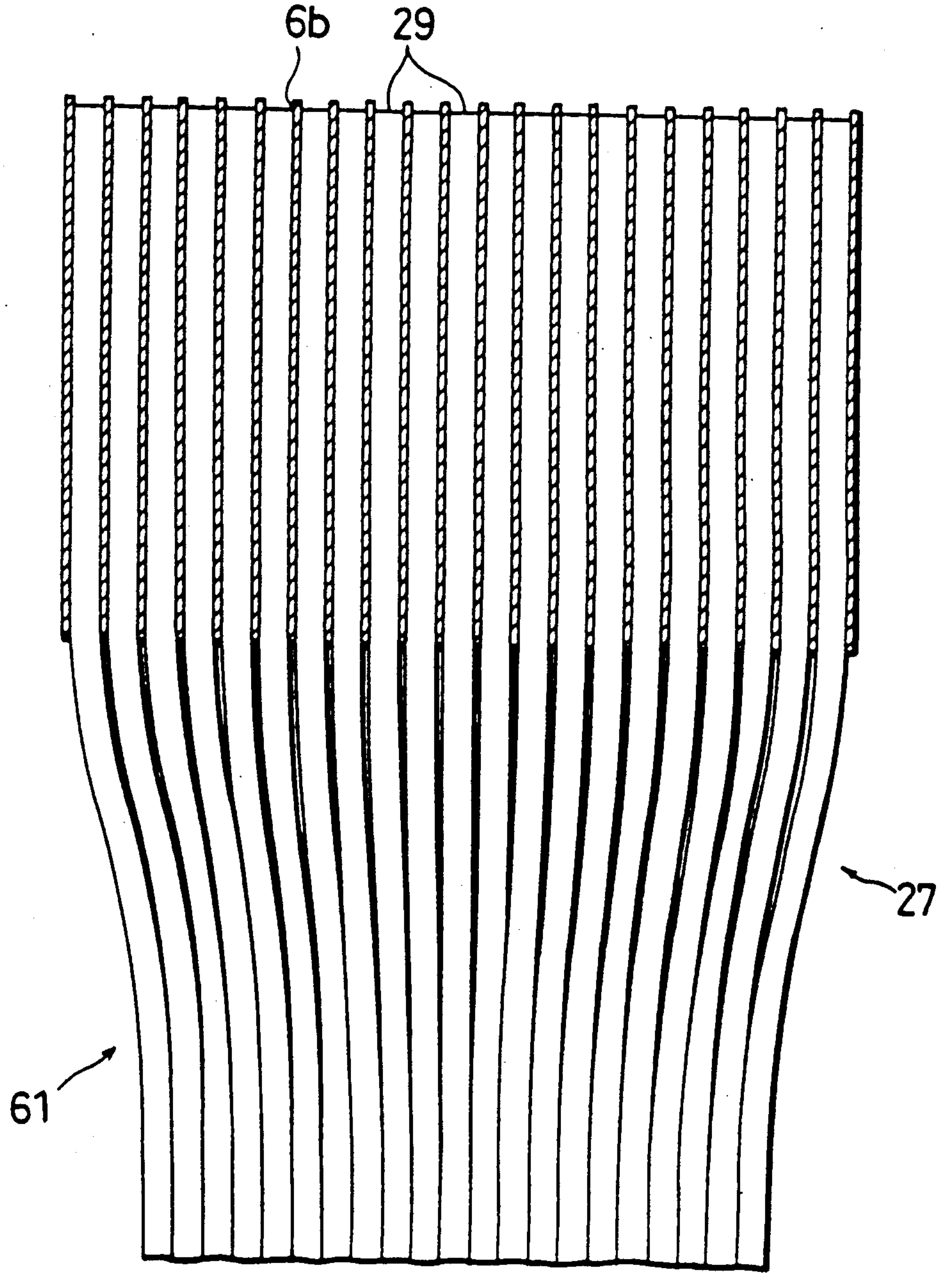
FIG. 14 is a longitudinal cross sectional view of the same along lines XIV—XIV of FIG. 13.
Figure 15:
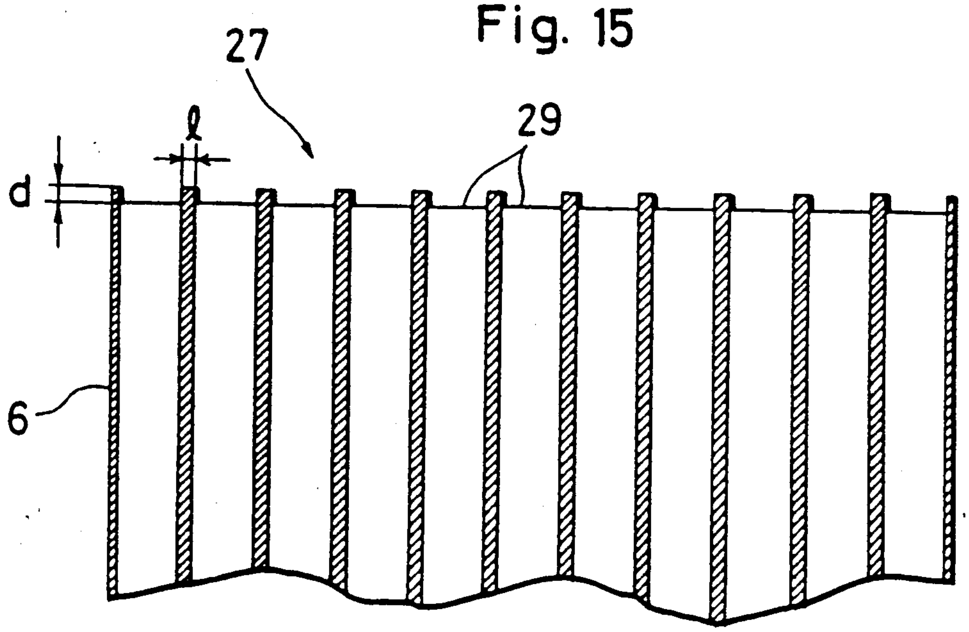
FIG. 15 is an enlarged view of the longitudinal cross section of the same.
Figure 16:
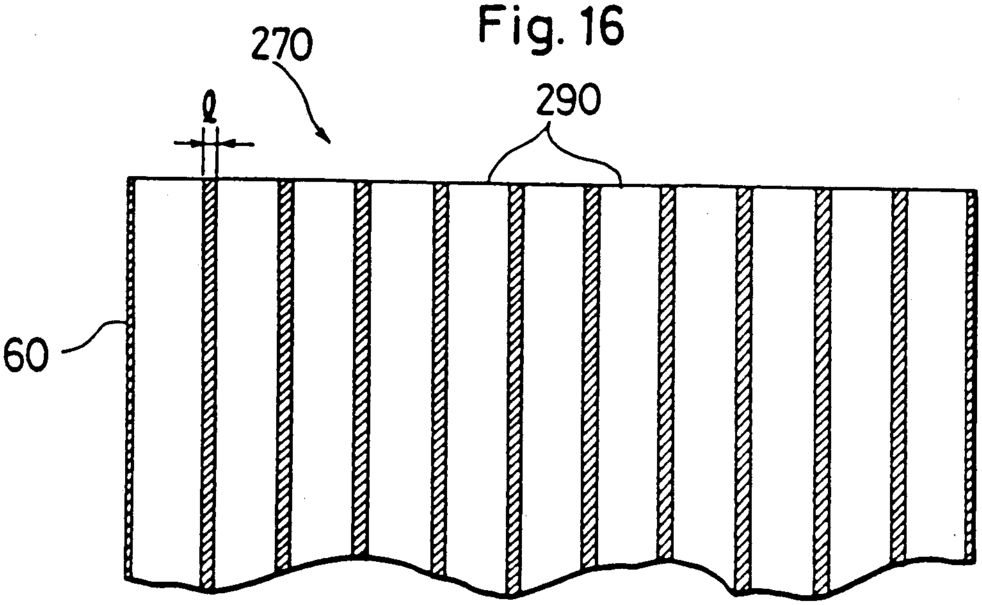
FIG. 16 is an enlarged view of a longitudinal cross section of another counter electrode array as a comparative example.

As shown in FIGS. 13 and 14, bottom ends of the pin counter electrodes 29 are extended substantially in parallel and gathered to form an electrode cord 61. The electrode cord 61 is connected to the bias power supply 8. The bias power supply 8 is to selectively apply bias voltages to the pin counter electrodes 29.

The holder 6 and the counter electrode 27 are integrated by the following method. After loading the pin counter electrodes 29 in the above space, epoxy or some other insulating resin is injected from an upper portion 6*b* of the holder 6 and solidified.

The upper ends of the pin counter electrodes 29 are sunk in the holder 6 by immersing an upper portion of the holder 6 in an aqueous solution of iron chloride (with hydrochloric acid) and etching a specified length of the pin counter electrodes 29. The length to be etched is controlled by adjusting the density and temperature of the above solution, immersing time, and the like.

The integrating method, the materials of the holder 6 and the pin counter electrodes 29 are not limited to those mentioned above. Any construction in which pin counter electrodes are insulated from one another and supported by a holder also insulated from the electrodes is acceptable.

In order to prove sinking the upper ends of the pin counter electrodes 29 in the holder 6 is effective, the following experiment was conducted. The experiment will be described referring to FIGS. 15 and 16.

The counter electrode array 27 according to this invention and another counter electrode array 270 as a comparative example comprising pin counter electrodes 290 and a holder 60 were each incorporated in the image recording apparatus and how leakages occurred was checked. Table 2 shows the specifications of each pin counter electrode 29 and each pin counter electrode 290. Other specifications were the same for both 27 and 270. Table 3 shows the experiment conditions. The pin recording electrodes 9 of the recording electrode array 4 were on the same plane with the top surface of the supporting unit 10.

TABLE 2

| | Pin electrode 29 | Pin electrode 290 |
|---|---|---|
| Distance between neighboring electrodes l (μm) | 20 | 20 |
| Sinking depth d (μm) | 30 | 0 |

TABLE 3

| | Pin recording electrode | Pin counter electrode | Sleeve |
|---|---|---|---|
| ON | −300 V | +300 V | GND |
| OFF | +100 V | −100 V | GND |

Used as a developer was a double-component one comprising a non-magnetic toner (charged negative) formed of stylene-acrylic resin and an insulating magnetic carrier formed of ferrite.

Results

In the case of the array 270, a leakage occurred between some of the pin counter electrodes 290 in the state of ON and the other pin counter electrodes 290 in the state of OFF. As a result, both image density and resolution were lowered to deteriorate the image quality.

In the case of the array 27 according to this invention, a leakage was restricted in the same conditions with the above.

Reasoning

In the case of the array 270, a leakage was especially conspicuous when the recording paper was damp. This is attributed to that the dampness changes the electric resistance of the recording paper. It was also confirmed that, even when the recording paper was dry, continuous recording on multiple papers caused a leakage. This is considered to occur because paper powders accumulated on the curved surface of the holder 6 in the course of continuous recording are charged, whereby to cause a leakage.

In the case of the array 27, since the pin counter electrodes 29 were sunk in the holder 6, the practical distance between the neighboring pin counter electrodes 29 (l+2d) is larger than that of the array 270. Therefore, the array 27 is more excellent in insulation, and so there is a low possibility of a leakage even if the recording paper is damp or continuous recording is conducted.

Since this allows high voltage application to the arrays 4 and 7, an excellent image with less fogging can be obtained.

Embodiment III

In order to improve image quality in the image recording apparatus equipped with a recording electrode array including a plurality of pin recording electrodes and a counter electrode, the following four are indispensable:

1) Appropriate image density

This is realized by controlling the thickness of the developer carried on the surface of the sleeve in the form of a thin layer.

2) Fogging prevention for better contrast

This is realized by controlling the distance between the developer and the recording material.

3) High resolution

This is realized by controlling the strength of the electric field between the recording electrode array and the counter electrode.

4) Use of an appropriate developer 1) through 4) will be explained in detail referring to FIG. 1 for convenience. The thickness of the developer in 1) is controlled by adjusting the distance $D_B$ between the sleeve 2 and a tip of the doctor blade 18. According to an experiment conducted by the inventor of this invention using a double-component developer comprising a non-magnetic toner formed of stylene-acryl resin and an insulating magnetic carrier formed of ferrite, $D_B \geqq 0.2$ mm is necessary for obtaining the uniform thickness. If $D_B$ is infinitely increased, however, the magnetic force between the developer and the sleeve 2 is weakened, which generates toner cloud to cause fogging. Therefore, the upper limit of $D_B$ is naturally determined.

The distance between the developer and the recording material 5 mentioned in 2) is controlled by adjusting the distance between the recording electrode array 4 and the counter electrode 7, or more practically, the distance $D_S$ between the recording electrode array 4 and a top surface of the holder 6. If $D_S$ is infinitely decreased, the recording material 5 gets in contact with the developer to cause fogging, and also the developer is partially accumulated on the surface of the sleeve 12. If $D_S$ is infinitely increased, the electric lines of force generated between the recording electrode array 4 and the counter electrode 7 is diverted to prevent accurate recording of thin lines or the like. In consequence, the upper and the lower limits of $D_S$ are naturally determined. An experiment by the inventor found out $D_B \leqq D_S \leqq D_B + 0.3$ mm.

The strength of the electric field mentioned in 3) is controlled by setting the difference in electric potential between the recording electrode array 4 and the counter electrode 7 large when recording is operated and small when recording is not operated. The above setting is possible by setting the voltages $V_r$ applied to the recording electrode array 4 high. If the upper ends of the pin recording electrodes 9 are not sunk in the supporting unit 10, the range of $V_r$ is restricted for the reason mentioned in the next paragraph.

The lowest possible resolution for practical use is 5 to 20 dots/mm. In order to obtain the above range of resolution, even the pin recording electrodes having the smallest possible diameter requires the distance between the neighboring pin recording electrodes to be, for example, 50 μm maximum. If every other pin recording electrodes of such a recording electrode array are grounded and the remaining pin recording electrodes are provided with voltages of −400 to −500 V for recording one dot line of pixels, a leakage occurs between the pin recording electrodes. This means $V_r$ is practically limited to several hundred volts at the maximum. If a conductive developer is used, the upper limit of the voltages is still lower.

If both the pin recording electrodes 9 and the counter electrode 7 are grounded when recording is not operated, the developer is adhered on the recording material 5 to cause fogging. Bias voltages $V_b$ of approximately −100 V are required to avoid the fogging.

From the above consideration, it can be concluded that the following conditions are desirable for practical use of the apparatus.

$D_B \geqq 0.2$ mm $D_B \leqq D_S \leqq D_B + 0.3$ mm $|V_r| \leqq 400$ V $|V_r| \geqq 100$ V However, practical recording with the above conditions generated fogging on almost all over the recording material 5 and drastically lowered image contrast. Further experiments have shown that toner cloud, which is generated on a contacting area between the recording material 5 and the recording head 3, causes the fogging. In order to substantially eliminate the toner cloud, the radius of curvature (R) of the holder 6 was reduced to the smallest possible value and thus the recording material 5 was contacted with the recording head 3 in a smallest possible area. However, it was not enough.

The above-mentioned electric leakage and toner cloud are solved by the devices of the first and the second embodiments. A third embodiment shown in FIG. 17 offers another device to solve them.

The third embodiment has the same construction as the first embodiment except that the counter electrode 37 has an auxiliary electrode 21 and that the upper ends of the pin recording electrodes 9 are not sunk in the supporting unit 10.

The counter electrode 37 is a plane plate integrated with a holder 6. A bottom end of the counter electrode 37 is drawn out from the holder 6 to form a cord 37*a*, which is connected to the bias power supply 8.

Figure 17:
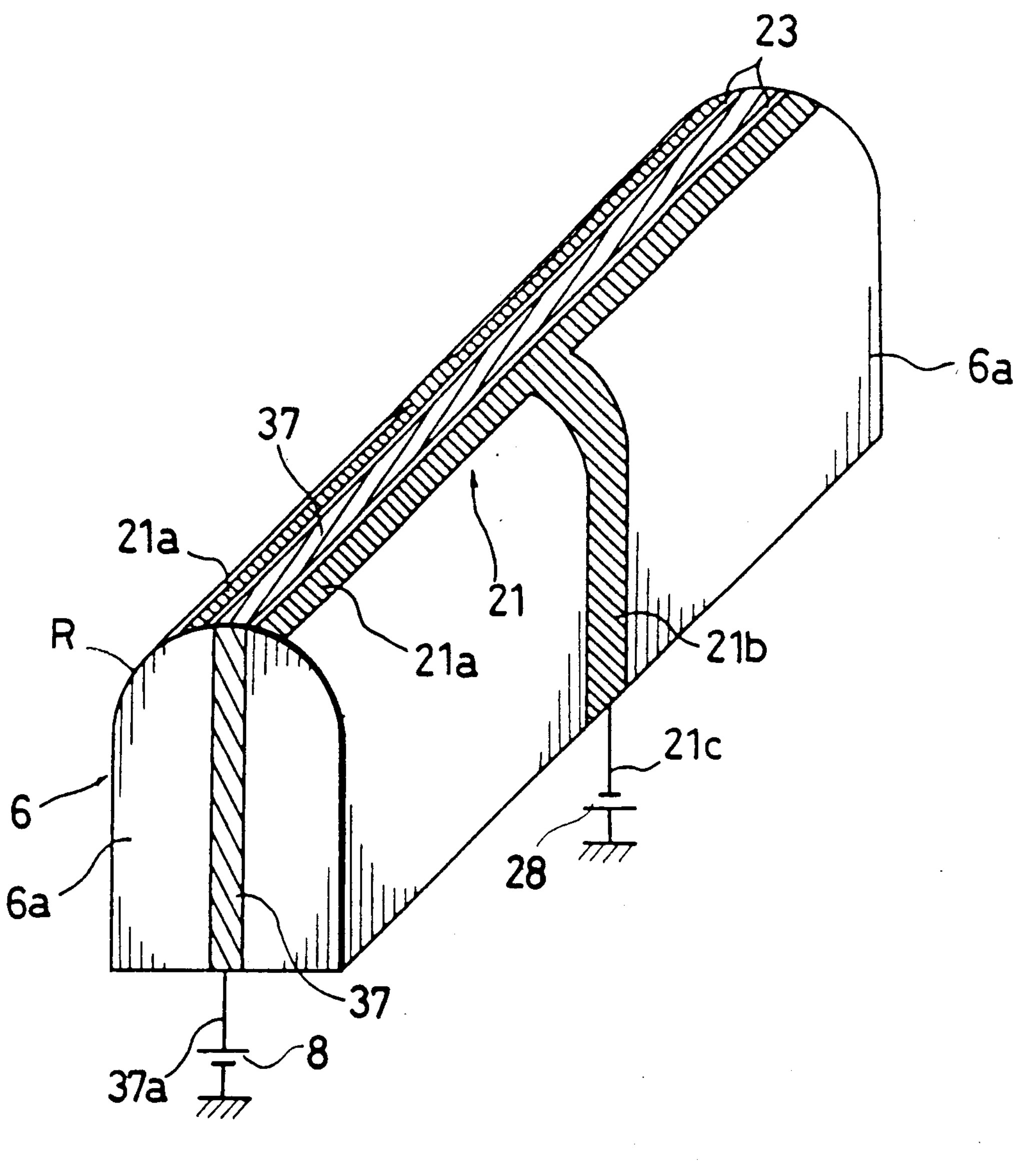
FIG. 17 is a perspective view of a counter electrode according to a third embodiment, FIG. 18 explains an electric field generated between the recording electrode array and the counter electrode of the third embodiment.

As shown in FIG. 17, the auxiliary electrode 21 is formed of a film-type material and is pasted on the holder 6 with an adhesive. More precisely, the auxiliary electrode 21 comprises a pair of bank portions 21*a* pasted on both banks of the counter electrode 37 on the top surface of the holder 6 and a pair of side portions 21*b* (only one of them is shown) perpendicularly extended from middle of the bank portions 21*c* on both sides of the holder 6.

The bank portions 21*a* are insulated from the counter electrode 37 by insulating areas 23. Bottom ends of the side portions 21*b* are drawn out and connected to form a cord 21*c*, which is connected to another bias power supply 28.

In the above construction, negative voltages are applied from the recording power supply 12 to the recording electrode array 4, positive voltages are from the bias power supply 8 to the counter electrode 37, and another negative voltages are from another bias power supply 28 to the auxiliary electrode 21. The toner 17 charged negative is repulsively splattered to be adhered on the recording material 5. This operation realizes excellence in the image quality for the reason mentioned below.

Figure 18:
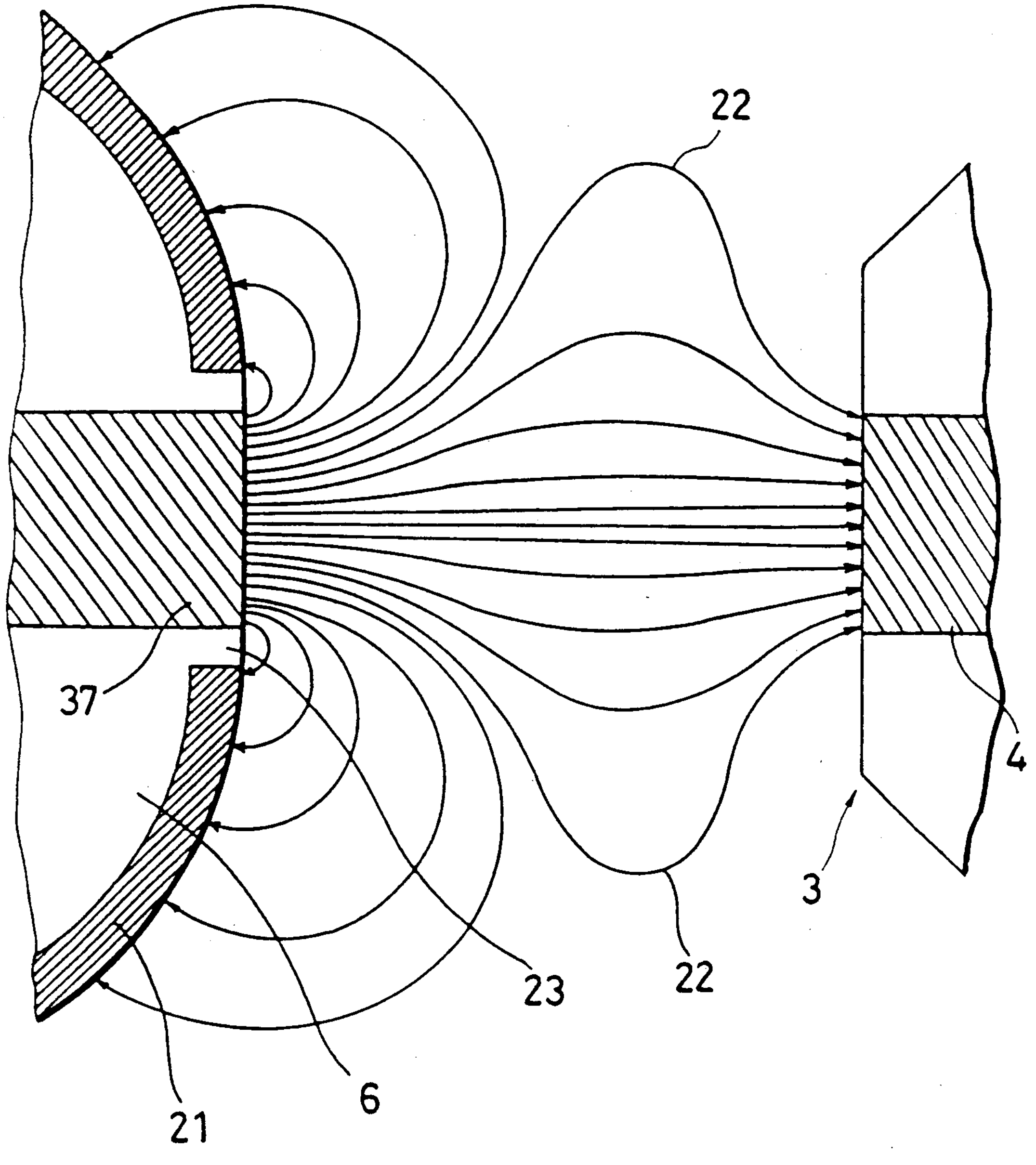

As shown in FIG. 18, some components of electric lines of force which would, without the auxiliary electrode 21, divert from the desirable path between the recording head 3 and the counter electrode 37 converge in the vicinity of the auxiliary electrode. Since this generates an optimum electric field, the toner transported by Coulomb's force also converges in the vicinity of the auxiliary electrode. Accordingly, resolution is improved and also toner cloud is substantially eliminated. The result is a clear, high quality image.

In other words, some components mentioned above are electrically pushed back to an opposing area between the recording electrode array 4 and the counter electrode 37, whereby the density of the electric lines of force, namely electric flux density is improved and the desirable path of the electric lines of force is formed.

Concerning the third embodiment, another construction is also possible in which the whole holder 6 is formed of a conductive material and partially insulated from the counter electrode 37 so that the holder 6 should be charged oppositely to the toner 17. In this construction, since the holder 6 itself acts as the auxiliary electrode 21, the counter electrode 37 can be simplified in construction.

The auxiliary electrode 21 may be insulated from the counter electrode 37 by steps instead of the insulating areas 23. The steps offers better insulation than the insulating areas 23, resulting in a higher image quality.

Figure 19:
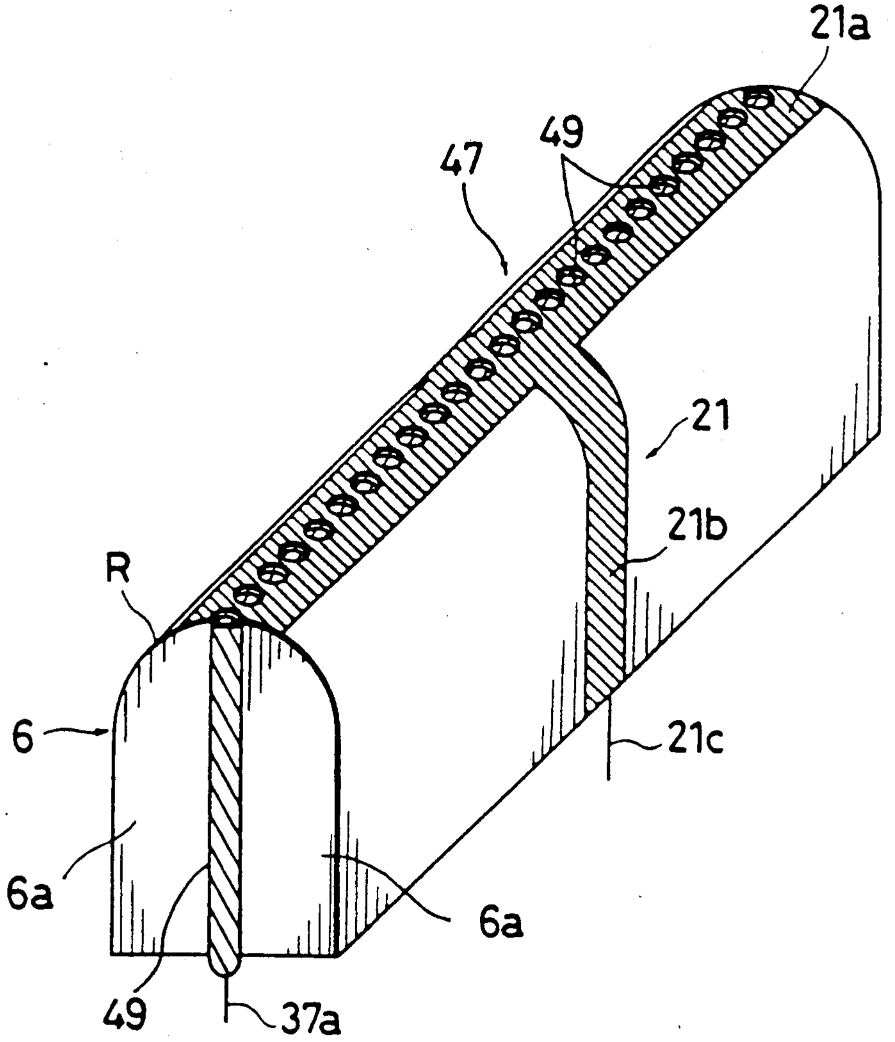
FIG. 19 is a perspective view of a variation of the third embodiment.

FIG. 19 shows a variation of the third embodiment, which employs a counter electrode array 47 which is the same as the counter electrode array 27 of the second embodiment. The counter electrode array 47 comprises a plurality of pin counter electrodes 49, and the auxiliary electrode 21 is also disposed in the same manner as in the third embodiment.

The counter electrode array 47 including many pin counter electrodes 49 with upper ends thereof sunk in the holder 6 and also having the auxiliary electrode 21 realizes still more excellent image quality.

Although the upper ends of the pin recording electrodes 9 of the recording electrode array 4 are on the same plane with the top surface of the supporting unit 10 in the above embodiment and the variation, they may also be sunk in the supporting unit 10.

Although an image is recorded in the recording material 5 in the above embodiments, the image may also be first recorded an intermediate material such as a transfer belt and then re-recorded on the material such as a plain paper.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image recording apparatus for forming an image on a recording material, the apparatus comprising:

- a recording head including a plurality of recording electrodes arranged in a line and a supporting member for supporting said plurality of recording electrodes, a pointed end of each recording electrode sinking in said supporting member so that an elevated partition wall portion is defined between adjacent recording electrodes;
- a sleeve on which said recording head is disposed;
- a counter electrode opposed to said recording head;
- a rotatable magnet roller arranged in said sleeve for transporting a developer to said recording head; and
- means for selectively applying an electric voltage to each recording electrode to provide the developer onto a recording material between said recording head and said counter electrode.

2. An image recording apparatus of claim 1, wherein said recording electrodes are formed of a permeable material.

3. An image recording apparatus for forming an image on a recording material, the apparatus comprising:

a recording head including a plurality of recording electrodes arranged in a line and a first supporting member for supporting said plurality of recording electrodes;

a counter electrode unit including a plurality of counter electrodes opposed to said plurality of recording electrodes, respectively, and a second supporting member for supporting said plurality of counter electrodes, a pointed end of each counter electrode sinking in said second supporting member so that an elevated partition wall portion is defined between adjacent counter electrodes;

transporting means for transporting a developer to said recording head; and applying means for selectively applying an electric voltage to each recording electrode to provide the developer onto a recording material between said recording head and said counter electrode unit.

4. An image recording apparatus of claim 3, wherein said recording electrodes are formed of a permeable material.

5. An image recording apparatus of claim 3, wherein an upper surface of said counter electrode unit is curved upward with a specified radius of curvature.

6. An image recording apparatus for forming an image on a recording material, the apparatus comprising:

a recording head including a plurality of recording electrodes arranged in a line and a first supporting member for supporting said plurality of recording electrodes;

a counter electrode unit including a plurality of counter electrodes opposed to said plurality of recording electrodes, respectively, and a second supporting member for supporting said plurality of counter electrodes, a pointed end of each counter electrode sinking in said second supporting member so that an elevated partition wall portion is defined between adjacent counter electrodes;

transporting means for transporting a developer to said recording head;

first applying means for selectively applying a first electric voltage to each recording electrode to provide the developer onto a recording material between said recording head and said counter electrode unit; and second applying means for selectively applying a second electric voltage of the opposite polarity from that of said first electric voltage to each counter electrode.

7. An image recording apparatus of claim 6, wherein said recording electrodes are formed of a permeable material.

8. An image recording apparatus of claim 6, wherein an upper surface of said counter electrode unit is curved upward with a specified radius of curvature.

9. An image recording apparatus for forming an image on a recording material, the apparatus comprising:

a recording head including a plurality of recording electrodes arranged in a line and a supporting member for supporting said plurality of recording electrodes, a pointed end of each recording electrode sinking in said first supporting member so that an elevated partition wall portion is defined between adjacent recording electrodes;

a counter electrode unit including a plurality of counter electrodes opposed to said plurality of recording electrodes, respectively, and a second supporting member for supporting said plurality of counter electrodes, a pointed end of each counter electrode sinking in said second supporting member so that an elevated partition wall portion is defined between adjacent counter electrodes;

transporting means for transporting a developer to said recording head;

first applying means for selectively applying a first electric voltage to each recording electrode to provide the developer onto a recording material between said recording head and said counter electrode unit; and second applying means for selectively applying a second electric voltage of the opposite polarity from that of said first electric voltage to each counter electrode.

10. An image recording apparatus of claim 9, wherein said recording electrodes are formed of a permeable material.

11. An image recording apparatus of claim 9, wherein an upper surface of said counter electrode unit is curved upward with a specified radius of curvature.

12. An image recording apparatus for forming an image on a recording material, the apparatus comprising:

a recording head including a plurality of recording electrodes arranged in a line and a supporting member for supporting said plurality of recording electrodes;

a counter electrode opposed to said recording head;

transporting means for transporting a developer to said recording head;

an auxiliary electrode disposed in the vicinity of said counter electrode;

first applying means for selectively applying a first electric voltage to each recording electrode to provide the developer onto a recording material between said recording head and said counter electrode; and second applying means for applying a second electric voltage of the same polarity as that of said first electric voltage to said auxiliary electrode.

13. An image recording apparatus of claim 12, wherein said recording electrodes are formed of a permeable material.

14. An image recording apparatus for forming an image on a recording material, the apparatus comprising:

a recording head including a plurality of recording electrodes arranged in a line and a supporting member for supporting said plurality of recording electrodes, a pointed end of each recording electrode sinking in said supporting member so that an elevated partition wall portion is defined between adjacent recording electrodes;

a counter electrode opposed to said recording head;

transporting means for transporting a developer to said recording head;

an auxiliary electrode disposed in the vicinity of said counter electrode;

first applying means for selectively applying a first electric voltage to each recording electrode to provide the developer onto a recording material between said recording head and said counter electrode; and second applying means for applying a second electric voltage of the same polarity as that of said first electric voltage to said auxiliary electrode.

15. An image recording apparatus of claim 14, wherein said recording electrodes are formed of a permeable material.

16. An image recording apparatus for forming an image on a recording material, the apparatus comprising:

a recording head including a plurality of recording electrodes arranged in a line and a first supporting member for supporting said plurality of recording electrodes;

a counter electrode unit including a plurality of counter electrodes opposed to said plurality of recording electrodes, respectively, and a second supporting member for supporting said plurality of counter electrodes, a pointed end of each counter electrode sinking in said second supporting member so that an elevated partition wall portion is defined between adjacent counter electrodes;

transporting means for transporting a developer to said recording head;

an auxiliary electrode disposed in the vicinity of said counter electrode unit;

first applying means for selectively applying a first electric voltage to each recording electrode to provide the developer onto a recording material between said recording head and said counter electrode unit;

second applying means for selectively applying a second electric voltage of the opposite polarity from that of said first electric voltage to each counter electrode; and third applying means for applying a third electric voltage of the same polarity as that of said first electric voltage to said auxiliary electrode.

17. An image recording apparatus of claim 16, wherein said recording electrodes are formed of a permeable material.

18. An image recording apparatus of claim 16, wherein an upper surface of said counter electrode unit is curved upward with a specified radius of curvature.

19. An image recording apparatus for forming an image on a recording material, the apparatus comprising:

a recording head including a plurality of recording electrodes arranged in a line and a first supporting member for supporting said plurality of recording electrodes, a pointed end of each recording electrode sinking in said first supporting member so that an elevated partition wall portion is defined between adjacent recording electrodes;

a counter electrode unit including a plurality of counter electrodes opposed to said plurality of recording electrodes, respectively, and a second supporting member for supporting said plurality of counter electrodes, a pointed end of each counter electrode sinking in said supporting member so that an elevated partition wall portion is defined between adjacent counter electrodes;

transporting means for transporting a developer to said recording head;

an auxiliary electrode disposed in the vicinity of said counter electrode unit;

first applying means for selectively applying a first electric voltage to each recording electrode to provide the developer onto a recording material between said recording head and said counter electrode unit;

second applying means for selectively applying a second electric voltage of the opposite polarity from that of said first electric voltage to each counter electrode; and third applying means for applying a third electric voltage of the same polarity as that of said first electric voltage to said auxiliary electrode.

20. An image recording apparatus of claim 19, wherein said recording electrodes are formed of a permeable material.

21. An image recording apparatus of claim 19, wherein an upper surface of said counter electrode unit is curved upward with a specified radius of curvature.

22. In an image recording apparatus including a plurality of electrode elements arranged in a line and a supporting member for supporting said plurality of electrode elements, the improvement comprising means for magnetically transporting a developer to said plurality of electrode elements, wherein a pointed end of each electrode element sinking in said supporting member so that an elevated partition wall portion is defined between the neighboring electrode elements.

* * * * *

UNITED STATES PATENT AND TRADEMARK OFFICE

CERTIFICATE OF CORRECTION

PATENT NO. : 5,030,974

DATED : July 9, 1991

INVENTOR(S) : Tange

It is certified that error appears in the above-identified patent and that said Letters Patent is hereby corrected as shown below:

On the title page:

FOREIGN APPLICATION PRIORITY DATA

Jan. 17, 1989 [JP] Japan ................ -- 1-8881--
Jan. 17, 1989 [JP] Japan ................ -- 1-8882--
Jan. 17, 1989 [JP] Japan ................ -- 1-8883--

Signed and Sealed this

Nineteenth Day of January, 1993

Attest:

DOUGLAS B. COMER

*Attesting Officer*

*Acting Commissioner of Patents and Trademarks*